(12) United States Patent
Daigo et al.

(10) Patent No.: US 12,377,466 B2
(45) Date of Patent: Aug. 5, 2025

(54) Ni-BASED CORROSION RESISTANT ALLOY POWDER FOR ADDITIVE MANUFACTURING AND MANUFACTURING METHOD OF ADDITIVE MANUFACTURING PRODUCT USING SAID POWDER

(71) Applicant: Proterial, Ltd., Tokyo (JP)

(72) Inventors: Yuzo Daigo, Tokyo (JP); Katsuo Sugahara, Tokyo (JP)

(73) Assignee: Proterial, Ltd., Tokyo (JP)

( * ) Notice: Subject to any disclaimer, the term of this patent is extended or adjusted under 35 U.S.C. 154(b) by 990 days.

(21) Appl. No.: 17/434,423

(22) PCT Filed: Feb. 12, 2020

(86) PCT No.: PCT/JP2020/005414
§ 371 (c)(1),
(2) Date: Aug. 27, 2021

(87) PCT Pub. No.: WO2020/179388
PCT Pub. Date: Sep. 10, 2020

(65) Prior Publication Data
US 2022/0143690 A1 May 12, 2022

(30) Foreign Application Priority Data
Mar. 4, 2019 (JP) ................. 2019-038162

(51) Int. Cl.
| B22F 1/052 | (2022.01) |
| B22F 1/00 | (2022.01) |
| B22F 10/28 | (2021.01) |
| B33Y 10/00 | (2015.01) |
| B33Y 70/00 | (2020.01) |
| C22C 19/05 | (2006.01) |

(52) U.S. Cl.
CPC ............ *B22F 10/28* (2021.01); *B22F 1/00* (2013.01); *B22F 1/052* (2022.01); *B33Y 10/00* (2014.12); *B33Y 70/00* (2014.12); *C22C 19/055* (2013.01); *C22C 19/056* (2013.01); *B22F 2301/15* (2013.01); *B22F 2304/10* (2013.01)

(58) Field of Classification Search
CPC ..................................... B22F 1/052
See application file for complete search history.

(56) References Cited

U.S. PATENT DOCUMENTS

| 3,046,108 | A | | 7/1962 | Eiselstein | |
| 5,529,642 | A | * | 6/1996 | Sugahara | ............... C22C 19/053 148/427 |
| 2005/0053513 | A1 | | 3/2005 | Pike, Jr. | ................ C22C 1/0433 148/428 |
| 2018/0104740 | A1 | * | 4/2018 | Yamamoto | ............. B22F 1/065 |
| 2018/0333775 | A1 | | 11/2018 | Nishida et al. | |
| 2019/0048451 | A1 | | 2/2019 | Ota et al. | |
| 2019/0055627 | A1 | * | 2/2019 | Nagatomi | ............. C22C 19/055 |
| 2019/0143413 | A1 | * | 5/2019 | Dave | ...................... B22F 10/80 700/118 |
| 2020/0206816 | A1 | * | 7/2020 | Daigo | ..................... B22F 10/28 |

FOREIGN PATENT DOCUMENTS

| CN | 107709586 | 2/2018 |
| JP | H0466607 | 3/1992 |
| JP | H06248378 | 9/1994 |
| JP | H0747989 | 5/1995 |
| JP | 2010001558 | 1/2010 |
| JP | 2016128190 | 7/2016 |

OTHER PUBLICATIONS

"Office Action of China Counterpart Application" with English translation thereof, issued on Sep. 22, 2022, p. 1-p. 16.
V.S. Sufiiarov et al., "The effect of layer thickness at selective laser melting," Procedia Engineering, vol. 174, Mar. 2017, pp. 126-134.
Amir Mostafaei et al., "Comparison of characterization methods for differently atomized nickel-based alloy 625 powders," Powder Technology, vol. 333, Jun. 2018, pp. 180-192.
Peeyush Nandwana et al., "Powder bed binder jet 3D printing of Inconel 718: Densification, microstructural evolution and challenges," Current Opinion in Solid State and Materials Science, vol. 21, Aug. 2017, pp. 207-218.
"Search Report of Europe Counterpart Application", issued on Mar. 21, 2022, p. 1-p. 10.
"International Search Report (Form PCT/ISA/210) of PCT/JP2020/005414," mailed on Apr. 14, 2020, with English translation thereof, pp. 1-4.
"Written Opinion of Singapore Counterpart Application", issued on Jul. 28, 2022, p. 1-p. 6.

* cited by examiner

*Primary Examiner* — Christopher S Kessler
(74) *Attorney, Agent, or Firm* — JCIPRNET (57) ABSTRACT

To provide a Ni-based corrosion resistant alloy powder suitable for additive manufacturing and a manufacturing method using this powder for manufacturing an additive manufacturing product that has excellent corrosion resistance and few defects. This Ni-based corrosion resistant alloy powder for additive manufacturing has a component composition which contains, in mass %, Cr: 14.5-24.5%, Mo: 12.0-23.0%, Fe: 0.01-7.00%, Co: 0.001-2.500%, Mg: 0.010% or less, N: 0.040% or less, Mn: 0.001-0.50%, Si: 0.001-0.200%, Al: greater than 0-0.50%, Ti: 0.001-0.500%, Cu: 0.250% or less, V: 0.001-0.300%, B: 0.0001-0.0050%, Zr: 0.0001-0.0200% and O: 0.0010-0.0300%, the remainder being Ni and unavoidable impurities; the C, S and P contained as the aforementioned unavoidable impurities include less than 0.05% of C, less than 0.01% of S and less than 0.01% of P, wherein the powder has a particle distribution in which d10 is 15-100 μm, d50 is 30-250 μm and d90 is 50-480 μm.

7 Claims, 1 Drawing Sheet

Ni-BASED CORROSION RESISTANT ALLOY POWDER FOR ADDITIVE MANUFACTURING AND MANUFACTURING METHOD OF ADDITIVE MANUFACTURING PRODUCT USING SAID POWDER

CROSS-REFERENCE TO RELATED APPLICATION

This application is a 371 application of an international PCT application serial no. PCT/JP2020/005414, filed on Feb. 12, 2020, which claims the priority benefit of Japan application JP2019-038162, filed on Mar. 4, 2019. The entirety of the above-mentioned patent application is hereby incorporated by reference herein and made a part of this specification.

TECHNICAL FIELD

The present invention relates to, for example, a member used in a corrosive environment such as a wet corrosive environment, and in a semiconductor manufacturing device that handles halogen-containing gases causing severe corrosion such as HCl, $Cl_2$, HF, $F_2$, $NF_3$, $ClF_3$ and HBr, a member and the like with which these gases come into direct contact, a Ni-based corrosion resistant alloy powder for additive manufacturing required for additive manufacturing of this member, and a method of manufacturing an additive manufacturing product using this powder.

BACKGROUND ART

Generally, members used in chemical plants, pharmaceutical manufacturing, semiconductor processing and the like are required to have corrosion resistance to withstand a corrosive environment. With regard to this, there is a particularly strong demand to use halogen-containing gases such as HCl, $Cl_2$, HF, $F_2$, $NF_3$, $ClF_3$ and HBr, which cause a particularly severely corrosive environment, in semiconductor manufacturing process gases, and for that purpose, ultra-pure gases are used. As semiconductors have become finer and higher in definition such as in 3D printing, the allowable size of particles has become smaller and the demand for corrosion resistance of metal materials forming device members and pipe members has become stricter due to the corrosion of metal members with corrosive gases. Therefore, materials have been upgraded from the conventional SUS316L to so-called Ni-based corrosion resistant alloys containing mainly Ni and about 15 mass % or more of Cr and Mo, and having better corrosion resistance.

For example, as shown in Patent Literature 1, it has been proposed to use a Ni-based alloy composed of, in mass % (hereinafter % indicates mass %) Ni: 50% or more, Cr: 14.5 to 16.5%, Mo: 15.0 to 17.0%, W: 3.0 to 4.5%, Fe: 4.0 to 7.0%, and a low carbon content and a low silicon content, or a Ni-based alloy composed of Ni: 50% or more, Cr: 20.0 to 22.5%, Mo: 12.5 to 14.5%, W: 2.5 to 3.5%, Fe: 2.0 to 6.0%, and a low carbon content and a low silicon content, as a bellows member of a corrosion resistant valve for ultra-high purity gas control in a semiconductor manufacturing device.

In addition, as a bellows member of an ultra-high purity gas control valve used in a ultra-high purity gas manufacturing device and a semiconductor manufacturing device for semiconductor manufacturing processing, Ni-based alloys such as a Ni-based alloy (Ni-based alloy composed of Ni: 58% or more, Cr: 20 to 23%, Fe: 5.0% or less, Mo: 8.0 to 10.0%, Nb (+Ta): 3.15 to 4.15%, and a low carbon content and a low silicon content) known as UNS N06625 (corresponding to Inconel 625 (registered trademark)), a Ni-based alloy (Ni-based alloy composed of Ni: 50% or more, Cr: 14.5 to 16.5%, Mo: 15.0 to 17.0%, W: 3.0 to 4.5%, Fe: 4.0 to 7.0%, and a low carbon content and a low silicon content) known as UNS N10276 (corresponding to Hastelloy C276 (registered trademark)), and a Ni-based alloy (Ni-based alloy composed of Ni: 50% or more, Cr: 20 to 22.5%, Mo: 12.5 to 14.5%, W: 2.5 to 3.5%, Fe: 2.0 to 6.0%, and a low carbon content and a low silicon content) known as UNS N06022 (corresponding to Hastelloy C22 (registered trademark)) have been proposed.

Here, "UNS" indicating an alloy type of a Ni alloy is "Unified Numbering System" defined in ASE HS-1086 and ASTM DS-566, and N06625, N10276, N06022, N07718 (described below), and the like are unique numbers for these registered alloys.

In addition, in Patent Literature 2, as a material for producing a valve attached to a cylinder for being filled with, storing and transporting halogen compound gases causing severe corrosion such as HCl, HF, and HBr, and additionally halogen-containing gases such as chlorine, fluorine, and bromine, a Ni-based corrosion resistant alloy having a component composition including Cr: 14.5 to 24%, Mo: 12 to 23%, Fe: 0.01 to 6%, Mg: 0.001 to 0.05%, N: 0.001 to 0.04%, Mn: 0.05 to 0.5%, Si: 0.01 to 0.1%, Al: 0.01 to 0.5%, Ti: 0.001 to 0.5%, Cu: 0.01 to 1.8%, V: 0.01 to 0.5%, and B: 5 to 50 ppm, and optionally, further including Ta: more than 1% and 3.4% or less, W: 2 to 5%, and Co: 0.01 to 5%, with the remainder composed of Ni and unavoidable impurities, contents of C, S and P contained as the unavoidable impurities being adjusted to C: less than 0.05%, S: less than 0.01% and P: less than 0.01%, and having excellent corrosion resistance and mold forgeability has been proposed. Here, it is described that, when mold forging is performed on the Ni-based corrosion resistant alloy, cracks due to mold forging do not occur, and by simply performing minimal final finishing machining, a valve of a cylinder for being filled with halogen-containing gases and halogen compound gases with excellent dimensional accuracy can be manufactured.

However, the Ni-based alloys in the above conventional technologies are molded into members having a predetermined shape by machining or welding a material of a forged product or a rolled plate, but it is difficult to impart a complex shape with high accuracy to a member by machining, welding or the like.

However, in recent years, additive manufacturing technology called a 3D printing has advanced, and in machining of raw materials such as plates, bars, and pipes, it has become possible to impart complex shapes that would previously have been difficult or impossible to impart.

Thus, in the production of relatively small products that require accuracy, metal powders have also come to be used as raw materials which are applied in additive manufacturing.

Among additive manufacturing methods, as additive manufacturing methods in which metal layers are laminated using a metal powder, a method (Powder Bed Fusion method, PBF) in which a process of forming a metal powder layer and a process in which a laser or electron beam is emitted to a predetermined area of the metal powder layer and the metal powder in the area is melted and solidified are alternately repeated, and a method (Directed Energy Deposition method, DED) in which a metal powder is continuously injected at a forward position in a direction in which a laser or electron beam is moved and the supplied metal powder is irradiated with the laser or electron beam and melted and solidified are mainstream. In addition, for the laser or electron beam, a selective laser melting method (SLM), an electron beam melting method (EBM) or the like may be used. In addition, as a laser, for example, a fiber laser can be used.

In addition, as the metal powder used for additive manufacturing, for example, a Ni-based ultra heat-resistant alloy powder having a composition corresponding to a Ni-based ultra heat-resistant alloy (nominal composition: Ni-19% Cr-3% Mo-5% (Nb+Ta)-0.9% Ti-0.5% Al-19% Fe) known as UNS N07718 (corresponding to Inconel 718 (registered trademark)) shown in Patent Literature 3 has already been applied, and is mainly used for producing a member having a complex shape for aircraft that require heat resistance.

CITATION LIST

Patent Literature

[Patent Literature 1]
Japanese Examined Patent Publication No. 7-47989
[Patent Literature 2]
Japanese Patent Laid-Open No. 2010-1558
[Patent Literature 3]
U.S. Pat. No. 3,046,108

SUMMARY OF INVENTION

Technical Problem

Regarding a halogen-containing gas used as a process gas in the semiconductor manufacture technology, a gas with ultra-high purity is used. However, as the wiring width of semiconductor chips has become finer, contamination management has become extremely strict. In addition, chemical plants and pharmaceutical devices often have severely corrosive environments, and even if this is not as severe as with halogen-containing gases, fluids used often contain chlorine ions, and corrosion resistance against chlorine ions with a high concentration is desired.

In addition, the design of constituent members and components thereof has become more complicated, and particularly, it has become necessary to impart not only a shape of an outer surface side but also a shape of an inner side that is in direct contact with a gas. Therefore, in mold forging and machining, there are demands that exceed the production range thereof.

As described above, in the field of ultra heat-resistant alloys, additive manufacturing can be applied for manufacturing members with complex shapes, but a method of producing a corrosion resistant alloy that can withstand a severely corrosive environment in the above additive manufacturing and a powder suitable for achieving this with high quality have not yet been provided. That is, there is a strong demand for a Ni-based corrosion resistant alloy powder suitable for additive manufacturing, which has excellent corrosion resistance, and with which complex shapes with few defects can be imparted, and there is a strong demand for the development of an additive manufacturing product such as a member for semiconductor manufacturing device using this Ni-based corrosion resistant alloy powder.

Here, an objective of the present invention is to provide a Ni-based corrosion resistant alloy powder for additive manufacturing which has excellent corrosion resistance in a severely corrosive environment (for example, a wet environment containing chlorine or a semiconductor process gas environment) and in which a defect rate during additive manufacturing can be reduced, and a method of manufacturing an additive manufacturing product using this powder.

Solution to Problem

A Ni-based corrosion resistant alloy powder for additive manufacturing of the present invention is composed of a powder of a Ni-based alloy having a component composition including, in mass %, Cr: 14.5 to 24.5%, Mo: 12.0 to 23.0%, Fe: 0.01 to 7.00%, Co: 0.001 to 2.500%, Mg: 0.010% or less, N: 0.040% or less, Mn: 0.001 to 0.50%, Si: 0.001 to 0.200%, Al: more than 0 and 0.50% or less, Ti: 0.001 to 0.500%, Cu: 0.250% or less, V: 0.001 to 0.300%, B: 0.0001 to 0.0050%, Zr: 0.0001 to 0.0200%, and O: 0.0010 to 0.0300%, with the remainder being Ni and unavoidable impurities, wherein C, S and P are contained as the unavoidable impurities (C: less than 0.05%, S: less than 0.01% and P: less than 0.01%), wherein, in a cumulative distribution curve showing the relationship between a particle size and a volume cumulative from a small particle size side obtained by a laser diffraction method, a particle size d10 corresponding to a cumulative frequency of 10 volume % of the powder is 15 μm or more and 100 μm or less, a particle size d50 corresponding to a cumulative frequency of 50 volume % of the powder is 30 μm or more and 250 μm or less, and a particle size d90 corresponding to a cumulative frequency of 90 volume % of the powder is 50 μm or more and 480 μm or less.

In the Ni-based corrosion resistant alloy powder for additive manufacturing, the uniformity represented by (d90−d10)/d50 may be 1.5 or less.

In addition, the component composition may further include any one of Ta: 2.5% or less and W: 5.0% or less as necessary, and preferably, Ta: more than 1.0 and 2.5% or less, and W: 2.0 to 5.0%.

The present invention is a method of manufacturing a metal additive manufacturing product including performing additive manufacturing using the Ni-based corrosion resistant alloy powder for additive manufacturing as a raw material powder. The additive manufacturing product is preferably a member for semiconductor manufacturing device. In addition, the additive manufacturing method in this case is preferably a powder bed fusion method using an electron beam or a directed energy deposition method using an electron beam.

Advantageous Effects of Invention

The Ni-based corrosion resistant alloy powder for additive manufacturing of the present invention causes very few defects, has excellent spreading properties and transport properties during additive manufacturing, and has excellent additive manufacturing properties. In addition, additive manufacturing products produced by additive manufacturing (for example, member or component for semiconductor manufacturing device (hereinafter simply referred to as "member for semiconductor manufacturing device")) have excellent corrosion resistance at least under a wet environment, and also exhibit excellent corrosion resistance under a semiconductor process gas environment with $Cl_2$, HBr, $NF_3$ and the like.

In addition, when the member for semiconductor manufacturing device is produced by additive manufacturing using the Ni-based corrosion resistant alloy powder for additive manufacturing, since it is possible to produce a member for semiconductor manufacturing device made of an additive manufacturing product having few defects and high corrosion resistance, the degree of freedom in design of the member for semiconductor manufacturing device increases significantly, advances can be made in semiconductor manufacturing devices, and industrial effects are excellent.

DESCRIPTION OF EMBODIMENTS

Hereinafter, one embodiment of the present invention will be described. First, the reason for limiting the component composition of the Ni-based corrosion resistant alloy powder for additive manufacturing of the present invention (hereinafter simply referred to as a Ni-based corrosion resistant alloy powder) will be described in detail, and a particle size distribution and a powder particle size will be then described.

[Cr: 14.5% to 24.5% (% is Mass %, the Same Applies Hereinafter)]

Cr is effective in improving corrosion resistance in a corrosive environment. For example, when it is used for a member for semiconductor manufacturing device such as an additive manufacturing product, it is effective in improving corrosion resistance against halogen-containing gases such as HCl, $Cl_2$, HF, $F_2$, $NF_3$, $ClF_3$ and HBr. In particular, if the member for semiconductor manufacturing device is temporarily exposed to the outside air when it is opened, water from the atmosphere may be adsorbed on the metal surface, the adsorbed water and a halogen process gas may be hydrated, and electrochemical corrosion may occur. Cr exhibits corrosion resistance with respect to a hydrated acid particularly in an area with a relatively low concentration. In this case, Cr is required to be contained in an amount of 14.5% or more, but when it is contained in an amount of more than 24.5%, in combination with Mo, phase stability is impaired during additive manufacturing, it is difficult to maintain a single phase, a coarse μ phase is formed, and corrosion resistance deteriorates. Therefore, the content thereof is set to 14.5% to 24.5%.

The upper limit of Cr is preferably 22.5%, and more preferably 20.5%. In addition, the lower limit of Cr is preferably 15.0%, and more preferably 18.0%.

The upper limit values and the lower limit values of the Cr content can be arbitrarily combined. In addition, while the description will be omitted below, the upper limit values and the lower limit values for respective elements to be described below can be arbitrarily combined.

[Mo: 12.0% to 23.0%]

Like Cr, Mo is effective in improving corrosion resistance in a corrosive environment. That is, it is effective in improving corrosion resistance against halogen-containing gases such as HCl, $Cl_2$, HF, $F_2$, $NF_3$, $ClF_3$ and HBr. In particular, if the member for semiconductor manufacturing device is temporarily exposed to the outside air when it is opened, water from the atmosphere may be adsorbed on the metal surface, the adsorbed water and a halogen process gas may be hydrated, and electrochemical corrosion may occur. Mo exhibits corrosion resistance with respect to a hydrated acid particularly in an area with an intermediate to high concentration. In this case, Mo is required to be contained in an amount of 12.0% or more, but if it is contained in an amount of more than 23.0%, since Mo is inferior in oxidation at a high temperature, when the powder is produced by a gas atomization method or the like, an oxide film formed on the surface of each powder becomes thick. The additive manufacturing product produced using this powder is not preferable because defects caused by oxides become significant. Therefore, the content thereof is set to 12.0% to 23.0%.

The upper limit of Mo is preferably 20.5%, and more preferably 19.5%. In addition, the lower limit of Mo is preferably 14.0%, and more preferably 16.0%.

[Fe: 0.01% to 7.00%, Co: 0.001% to 2.500%]

Fe and Co have a higher melting point than Ni and have an effect of increasing the molten viscosity. The powder can be produced by, for example, blowing a molten metal in a spray form into an atmospheric gas and quenching it. When a powder is produced by adding Fe and Co, it is possible to easily control the particle size, and it is possible to minimize formation of a fine powder (particle size of less than 5 μm) with which additive manufacturing tends to be difficult. In this case, Fe is required to be contained in an amount of 0.01% or more, but if it is contained in an amount of more than 7.00%, corrosion resistance with respect to a hydrated acid deteriorates, and thus the content thereof is set to 0.01% to 7.00%.

The upper limit of Fe is preferably 5.50%, and more preferably 1.00%. In addition, the lower limit of Fe is preferably 0.05%, and more preferably 0.10%.

Similarly, Co is required to be contained in an amount of 0.001% or more, but if it is contained in an amount of more than 2.500%, this is not preferable because defects caused by shrinkage cavities at the micro level during powder solidification during additive manufacturing become significant. Therefore, the content of Co is set to 0.001 to 2.500%.

The upper limit of Co is preferably 1.000%, and more preferably 0.500%. In addition, the lower limit of Co is preferably 0.005%, and more preferably 0.010%.

[N: 0.040% or less, Mg: 0.010% or less, Mn: 0.001% to 0.50%]

When N, Mn and Mg are incorporated together, an effect of minimizing microsegregation is provided. During additive manufacturing, individual powder particles are instantly melted by a laser, while they are solidified by relative quenching and molded. In this case, there is a concern that microsegregation may occur. Due to the occurrence of microsegregation, a dilute area of elements such as Cr and Mo which exhibit corrosion resistance is formed, and corrosion resistance is overcome in this dilute area. Therefore, microsegregation should be minimized. N, Mn and Mg have effects of stabilizing a Ni-fcc phase, which is a parent phase and promoting solid-solutionizing of Cr and Mo, and therefore, as a result, the occurrence of microsegregation during quench solidification is minimized.

However, if N is contained in a very small amount, it has an effect of minimizing microsegregation during additive manufacturing, but if it is contained in an amount of more than 0.040%, a nitride is formed and the number of defects in the additive manufacturing product increases. Therefore, the content thereof is set to 0.040% or less.

The upper limit of N is preferably 0.030%, and more preferably 0.020%. In addition, the lower limit of the content of N is more than 0, preferably 0.001%, more preferably 0.003%, and still more preferably 0.005%.

Similarly, if Mg is contained in a very small amount, it has an effect of minimizing microsegregation during additive manufacturing, but if it is contained in an amount of more than 0.010%, microsegregation is promoted conversely, and it tends to deteriorate corrosion resistance of the additive manufacturing product. Therefore, the content thereof is set to 0.010% or less.

The upper limit of Mg is preferably 0.0050%, more preferably 0.0030%, and still more preferably 0.0020%. In addition, the lower limit of the content of Mg is more than 0, preferably 0.0001%, more preferably 0.0003%, and still more preferably 0.0005%.

On the other hand, when the content of Mn is less than 0.001%, there is no effect of minimizing microsegregation during additive manufacturing, and when it is contained in an amount of more than 0.50%, microsegregation is promoted conversely, and for example, corrosion resistance of the additive manufacturing product with respect to a semiconductor process gas tends to deteriorate. Therefore, the content thereof is set to 0.001% to 0.50%.

The upper limit of Mn is preferably 0.40%, and more preferably 0.35%. In addition, the lower limit of Mn is preferably 0.005%, more preferably 0.006%, and still more preferably 0.007%.

Here, it is confirmed that the effects of these three elements are not the same, and when the three elements are not contained in a predetermined range at the same time, there is no effect of minimizing microsegregation.

[Si: 0.001% to 0.200%, Al: More than 0 and 0.50% or Less, Ti: 0.001% to 0.500%]

Si, Al and Ti have an effect of improving the cleanliness in the alloy when added as deoxidizing agents. Thereby, a powder and another powder are smoothly bonded during additive manufacturing, and as a result, the occurrence of defects in the additive manufacturing product is minimized.

If Si is contained in an amount of 0.001% or more, the effect thereof is exhibited, but if it is contained in an amount of more than 0.200%, segregation occurs in the grain boundaries and the corrosion resistance tends to deteriorate. Therefore, the content of Si is set to 0.001% to 0.200%.

The upper limit of Si is preferably 0.100%, and more preferably 0.010%. In addition, the lower limit of Si is preferably 0.002%, and more preferably 0.005%.

Similarly, if Al is contained in a very small amount, a cleaning effect in the alloy is exhibited, but if it is contained in an amount of more than 0.50%, oxide formation during additive manufacturing becomes significant, and the number of defects in the additive manufacturing product increases. Therefore, the content of Al is set to more than 0 and 0.50% or less.

The upper limit of Al is preferably 0.40%, and more preferably 0.30%. In addition, the lower limit of Al is preferably more than 0, preferably 0.001%, more preferably 0.003%, and still more preferably 0.005%.

Similarly, if Ti is contained in an amount of 0.001% or more, a cleaning effect in the alloy is exhibited, but if it is contained in an amount of more than 0.500%, oxide formation during additive manufacturing becomes significant, and the number of defects in the additive manufacturing product increases. Therefore, the content of Ti is set to 0.001% to 0.500%.

The upper limit of Ti is preferably 0.200%, and more preferably 0.100%. In addition, lower limit of Ti is preferably 0.003%, and more preferably 0.005%.

[Cu: 0.250% or Less]

Cu is effective in improving corrosion resistance in a reducing wet corrosive environment with hydrochloric acid and hydrofluoric acid. Therefore, it is effective against electrochemical corrosion caused by the process gas and water adsorbed on the metal surface. If Cu is contained in a very small amount, the effect is exhibited, but if it is contained in an amount of more than 0.250%, oxides on the surface of the produced powder make the defects in the additive manufacturing product significant. Therefore, the content of Cu is set to 0.250% or less.

The upper limit of Cu is preferably 0.100%, and more preferably 0.010%. In addition, the lower limit of the content of Cu is more than 0, preferably 0.001%, more preferably 0.002%, and still more preferably 0.005%.

[V: 0.001% to 0.300%]

V is effective in minimizing the formation of powder particles with a large diameter when the powder is produced in the form of a mist from the molten metal. A powder with a diameter that is too large is not preferable because in this case defects become significant due to large gaps between particles during additive manufacturing. Therefore, large powder particles are removed during powder classification, but the yield (powder yield) thereby decreases, which causes a problem in industrial production. Unless V is added in an amount of 0.001% or more, an effect of minimizing coarse powder is not obtained, but if it is contained in an amount of more than 0.300%, this is not preferable because micronization proceeds conversely, and the required yield (powder yield) of the particle size is also reduced. Therefore, the content of V is set to 0.001% to 0.300%.

The upper limit of V is preferably 0.200%, and more preferably 0.100%. In addition, the lower limit of V is preferably 0.003%, and more preferably 0.005%.

[B: 0.0001% to 0.0050%, Zr: 0.0001% to 0.0200%]

B and Zr become nuclei in the solidification process and are effective in preventing the occurrence of shrinkage cavities. When the additive manufacturing product is molded, the process of melting and solidifying individual powder particles is repeated, but when shrinkage cavities occur in the solidification process, these defects become the source of particle generation, and thus it is inappropriate for an additive manufacturing product used as a member or component for the semiconductor manufacturing device.

If B is contained in an amount of 0.0001% or more, an effect of preventing the occurrence of shrinkage cavities is exhibited, but if it is contained in an amount of more than 0.0050%, segregation occurs in the grain boundaries and the corrosion resistance tends to deteriorate. Therefore, the content of B is set to 0.0001% to 0.0050%.

The upper limit of B is preferably 0.0040%, and more preferably 0.0030%. In addition, the lower limit of B is preferably 0.0002%, and more preferably 0.0005%.

Similarly, if Zr is contained in an amount of 0.0001% or more, an effect of preventing the occurrence of shrinkage cavities is exhibited, but if it is contained in an amount of more than 0.0200%, as in B, segregation occurs in the grain boundaries and the corrosion resistance tends to deteriorate. Therefore, the content of Zr is set to 0.0001% to 0.0200%.

The upper limit of Zr is preferably 0.0100%, more preferably 0.0080%, and still more preferably 0.0060%. In addition, the lower limit of Zr is preferably 0.0005%, and more preferably 0.0008%.

Here, it is confirmed that the effects of these two elements are not the same, and when the two elements are not contained in a predetermined range at the same time, there is no effect of preventing the occurrence of shrinkage cavities.

[O: 0.0010% to 0.0300%]

O is mainly instantly combined with Cr in a high temperature state immediately after solidification in the spraying process of the molten metal during powder production, and forms a very thin and strong oxide film on the powder surface, and thereby it has an effect of minimizing further progress of oxidation. Thereby, the amount of powder-derived oxides incorporated as a foreign substance into the additive manufacturing product is reduced to a very low level. If O is contained in an amount of 0.0010% or more, the effect is exhibited, but if it is contained in an amount of more than 0.0300%, oxides on the surface of the powder make the defects in the additive manufacturing product significant. Therefore, the content of O is set to 0.0010% to 0.0300%.

The upper limit of O is preferably 0.0200%, and more preferably 0.0100%. In addition, the lower limit of O is preferably 0.0020%, and more preferably 0.0050%.

[Ta: 2.5% or Less]

Ta is effective in improving corrosion resistance against a reducing acid or an oxidizing acid and corrosion resistance against pitting corrosion and crevice corrosion, and thus it is added as necessary. If added, 2.5% or less may be added. Here, if it is contained in an amount of more than 1.0%, an effect of significantly improving corrosion resistance is exhibited, but if it is contained in an amount of more than 2.5%, the amount of oxides formed on the powder surface during powder production increases, and thereby defects in the laminated product become significant. Therefore, the content is preferably more than 1.0% and 2.5% or less.

The upper limit of Ta is preferably 2.3%, and more preferably 2.2%. In addition, the lower limit of Ta is preferably 1.1%, and more preferably 1.2%.

[W: 5.0% or less]

Like Mo, W is effective in improving corrosion resistance against a reducing acid, and at the same time, it increases the melting point, and increases the viscosity of the molten metal, which makes it easy to control the particle size when the powder is produced. Simultaneously, it can minimize formation of a fine powder (particle size of less than 5 μm) with which additive manufacturing tends to be difficult, and thus it is added as necessary. If added, 5.0% or less may be added. In order to obtain a greater effect, it is preferable to add 2.0% or more. However, if it is contained in an amount of more than 5.0%, the melting point becomes higher than necessary, and thus the powder tends to become coarse, and the yield (powder yield) for classifying an appropriate powder diameter decreases. Therefore, the content is preferably 2.0% to 5.0%.

The upper limit of W is preferably 4.9%, and more preferably 4.5%. In addition, the lower limit of W is preferably 2.2%, and more preferably 2.5%.

[Unavoidable Impurities: C: Less than 0.05%, S: Less than 0.01%, P: Less than 0.01%]

As unavoidable impurities, C forms carbides with Cr near crystal grain boundaries, and increases deterioration of corrosion resistance. Therefore, the content of C is set to less than 0.05%. In addition, S and P segregate at the grain boundaries and cause cracks at a high temperature, and thus the amount thereof should be minimized to less than 0.01%.

In addition, the content of these unavoidable impurities is preferably small and may be 0%.

The component composition of the Ni-based corrosion resistant alloy powder for additive manufacturing of the present invention can be determined by the following measurement method.

As will be described below in examples, the powder for additive manufacturing after classification is melted in an appropriate aqueous solution, the aqueous solution is subjected to high frequency inductively coupled plasma (ICP) analysis, and the content of a predetermined component is measured.

Here, the content of C and S is determined using a carbon sulfur analysis device, and the content of N and O is determined using an oxygen nitrogen analysis device by performing gas analysis according to a combustion method.

The Ni-based corrosion resistant alloy powder of the present invention is used for the above additive manufacturing. For example, in additive manufacturing according to a directed energy deposition method (laser metal deposition: LMD) using a laser, when a laser or the like is emitted while the metal powder is supplied, both the underlying deposition layer and the supplied powder are melted and solidified to form a deposited product, and it is necessary to repeat this operation. In this deposition method, the laminate thickness per energy is thicker, and the allowable range of powder types that can be used is wider than in the powder bed method. However, since the metal powder is transported by the flux of an inert gas, it is required that the metal powder be smoothly supplied to the molten pool to be added on the flux, and that voids and the like be less likely to be generated. In addition, in the case of an electron beam melting method (EBM) using an electron beam, if the particle size is too small, a smoke phenomenon in which the powder floats occurs. Therefore, in both the LMD and EBM, defects and surface roughness are affected according to powder properties of the metal powder. Therefore, the metal powder is required to have good transport properties. Hereinafter, powder properties and transport properties of the Ni-based corrosion resistant alloy powder will be described.

[Particle Size Distribution]

The particle size distribution of the Ni-based corrosion resistant alloy powder of the present invention is obtained by a laser diffraction method using a laser diffraction type particle size distribution measurement device. In the cumulative distribution curve showing the relationship between the particle size and the volume cumulative from the small particle size side, when a particle size d10 corresponding to a cumulative frequency of 10 volume %, a particle size d50 corresponding to a cumulative frequency of 50 volume %, and a particle size d90 corresponding to a cumulative frequency of 90 volume % are measured, d10 is 15 μm or more and 100 μm or less. The lower limit of d10 is preferably 20 μm, and more preferably 40 μm. The upper limit of d10 is preferably 80 μm, and more preferably 50 μm. The upper limit values and the lower limit values of the d10 can be arbitrarily combined. Although the description is omitted, the same applies to the following d50 and d90.

d50 is 30 μm or more and 250 μm or less. The lower limit of d50 is preferably 60 μm, and more preferably 80 μm. The upper limit of d50 is preferably 200 μm, and more preferably 120 μm.

d90 is 50 μm or more and 480 μm or less. The lower limit of d90 is preferably 100 μm, and more preferably 150 μm. The upper limit of d90 is preferably 300 μm, and more preferably 250 μm or less.

In the case of LMD, when the particle size becomes small, the flow of powder during transportation becomes biased, and it becomes difficult to stably supply the powder to the molten pool. In addition, if the powder flows unevenly, the powder may be unevenly clogged even in the head. On the other hand, if the particle size becomes large, there is a concern that melted residue may occur due to insufficient power of the laser, which may affect defects and surface roughness. In addition, in the case of EBM, if the particle size is too small, a smoke phenomenon in which the powder floats occurs. In addition, as the particle size increases, it may affect defects and surface roughness.

When the particle size distribution of the present invention is provided, or when the numerical value requirements for d50 are simply satisfied, the powder can be stably supplied and molded in LMD and EBM. Therefore, good transport properties are obtained.

In addition, in the present invention, a numerical value represented by $(d90-d10)/d50$ is defined as uniformity. When the uniformity of the Ni-based corrosion resistant alloy powder is 1.5 or less, the spreading properties are good, and the uniformity is preferably 1.2 or less, and more preferably 1.1 or less. For the lower limit, the value of the uniformity can be reduced by classification or the like, but the powder yield and the productivity are lowered, for example, 0.8 or more is preferable and 0.9 or more is more preferable. For the uniformity represented by the above formula, it can be said that, when the numerical value is smaller, the width of the particle size distribution is narrower, the variation is smaller and the median diameter is uniform. In addition, it can be said that the cohesiveness is weaker and the fluidity is higher, and this is suitable for additive manufacturing.

As described above, when the Ni-based corrosion resistant alloy powder of the present invention has the above particle size distribution and uniformity, it thus has excellent powder transport properties and spreading properties. As a result, it is possible to reduce the defect rate during additive manufacturing and it is possible to obtain an additive manufacturing product in which the occurrence of defects is minimized.

[Powder Particle Size]

Additive manufacturing is a molding method in which individual powder particles are repeatedly melted and solidified to impart a shape. However, for example, in the powder bed method using SLM, if the particle size of the Ni-based corrosion resistant alloy powder is less than 5 μm, it is difficult to obtain a volume required for one melting and solidification, and thus it is difficult to obtain a sound additive manufacturing product. If the amount of the powder having a particle size of less than 5 μm is small, the powder yield is improved, and it contributes to reduction of the defect rate. On the other hand, if the particle size of the Ni-based corrosion resistant alloy powder exceeds 100 μm, a volume required for one melting and solidification is too large and it is difficult to obtain a sound additive manufacturing product. Since the amount of the powder having a particle size of more than 100 μm is small, power shortage of the laser is minimized, which contributes to reduction of the defect rate. That is, in the powder bed method using SLM, for the Ni-based corrosion resistant alloy powder, it is preferable to use a powder in a range of 5 μm or more and 100 μm or less and more preferable to use a powder in a range of 20 μm or more and 80 μm or less.

On the other hand, in EBM, since the beam diameter is larger than that in SLM, the particle size of the alloy powder used can increase. Therefore, it is preferable to use a powder in a particle size range of 5 μm or more and 500 μm or less and more preferable to use a powder in a particle size range of 20 μm or more and 250 μm or less.

In addition, the Ni-based corrosion resistant alloy powder can be produced using a gas atomization method, a water atomization method, a jet atomization method or the like. The particle shape of the Ni-based corrosion resistant alloy powder is preferably spherical, and the powder is more preferably produced by the gas atomization method.

Figure 1:
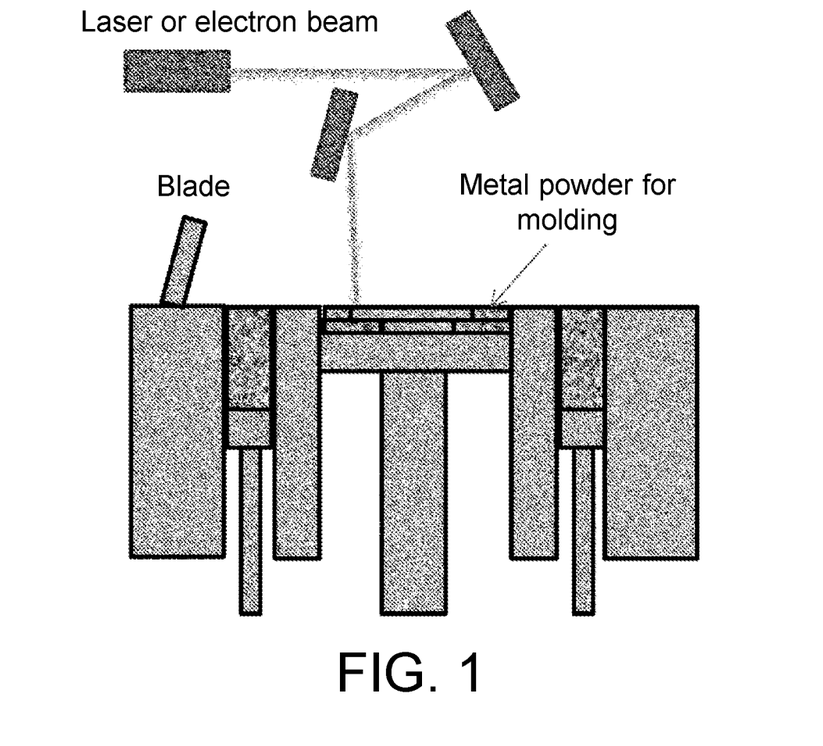
FIG. 1 shows a schematic view of an additive manufacturing device known in a powder bed fusion method.

For the Ni-based corrosion resistant alloy powder for additive manufacturing of the present invention, for example, in a powder bed method additive manufacturing device using an electron beam (EBM) shown in FIG. 1, the Ni-based corrosion resistant alloy powder for additive manufacturing of the present invention is supplied, a powder layer having a thickness of about 40 to 200 μm, and preferably 50 to 100 μm is formed by squeezing, a high energy electron beam with an output adjusted to, for example, about 100 to 2,000 W, is emitted to an area in which the powder is provided, and the alloy powder is selectively melted and bonded. The scanning speed in this case may be adjusted to, for example, about 200 to 2,000 mm/s. When the melting and solidification operation is repeated in this manner, additive manufacturing products having a desired shape can be laminated and manufactured.

According to additive manufacturing using the Ni-based corrosion resistant alloy powder for additive manufacturing of the present invention, there are very few defects, and a valve member of a cylinder for being filled with halogen-containing gases and halogen compound gases, which exhibits excellent corrosion resistance under a wet environment or semiconductor process gas environment, a gas contact member in a mass flow meter, a gas block member, and a member for semiconductor manufacturing device such as gas fittings can be obtained.

Figure 2:
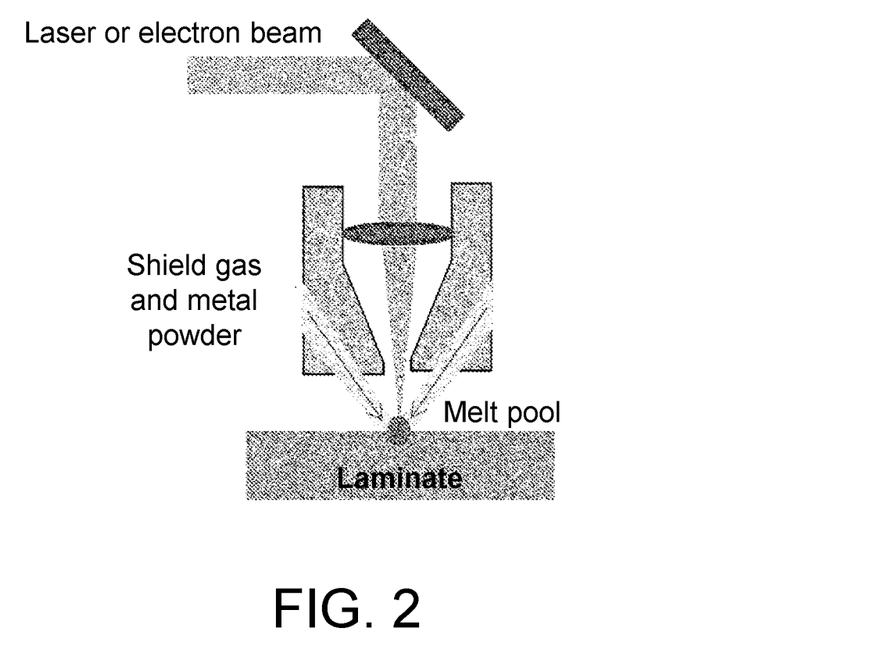
FIG. 2 shows a schematic view of an additive manufacturing device known in a directed energy deposition method.

In addition, as the additive manufacturing device, not only the device shown in FIG. 1, but also a directed energy deposition method additive manufacturing device shown in FIG. 2 can be used depending on the shape of the additive manufacturing product and the like. The model of the additive manufacturing device and the like are not particularly limited. For example, LMD can be used. Since LMD is easy to apply to an overlaying molded product or the like, it is useful for repairing a member having a thick laminate thickness and providing local corrosion resistance and strength.

Next, examples of the present invention will be described.

EXAMPLES

Example 1

Melted raw materials were prepared and melted using a high frequency vacuum melting furnace, and about 10 kg of each base alloy was prepared. In an argon atmosphere, using a gas atomization method, raw powders for obtaining the Ni-based corrosion resistant alloy powder for additive manufacturing having component compositions shown in Table 1, Table 2, Table 3, and Table 4 were prepared. Here, regarding C, S, and P corresponding to unavoidable impurities, the content of C was less than 0.05%, and the contents of S and P were less than 0.01%.

The raw gas atomized powders obtained above were directly classified into powders having a particle size of 20 to 80 μm for additive manufacturing and other powders using a plurality of sieves.

In Example 1, additive manufacturing was performed by a powder bed method (SLM) using a laser, and the corrosion resistance (wet environment and semiconductor process gas) of the Ni-based corrosion resistant alloy powder was confirmed. Here, in the tables, No. 41 to No. 48, No. 52, No. 54 to No. 60, No. 62 to No. 67, and No. 69 to No. 70 marked with * are examples outside the range of the composition according to the present invention. Here, there was no conventional product as the Ni-based corrosion resistant alloy powder for additive manufacturing.

TABLE 1

(Continued in Table 2)

| Alloy powder | Cr | Mo | Fe | Co | Mg | N | Mn | Si | Al |
|---|---|---|---|---|---|---|---|---|---|
| 1 | 18.8 | 18.7 | 0.34 | 0.011 | 0.0018 | 0.008 | 0.011 | 0.013 | 0.31 |
| 2 | 21.2 | 13.4 | 4.55 | 0.732 | 0.0013 | 0.012 | 0.161 | 0.031 | 0.32 |
| 3 | 15.4 | 16 | 6.04 | 1.214 | 0.0043 | 0.023 | 0.490 | 0.040 | 0.34 |
| 4 | 22.8 | 15.7 | 0.56 | 0.009 | 0.0004 | 0.027 | 0.132 | 0.013 | 0.21 |
| 5 | 20.4 | 16.3 | 0.14 | 0.152 | 0.0007 | 0.026 | 0.231 | 0.011 | 0.28 |
| 6 | 15.2 | 22.2 | 0.97 | 0.621 | 0.0008 | 0.022 | 0.244 | 0.026 | 0.24 |
| 7 | 14.6 | 15.4 | 0.62 | 0.399 | 0.0018 | 0.010 | 0.063 | 0.044 | 0.13 |
| 8 | 23.9 | 14.3 | 1.94 | 0.015 | 0.0024 | 0.027 | 0.162 | 0.016 | 0.08 |
| 9 | 22.5 | 12.1 | 4.04 | 0.062 | 0.0008 | 0.006 | 0.236 | 0.020 | 0.40 |
| 10 | 18.6 | 22.9 | 2.71 | 0.007 | 0.0021 | 0.012 | 0.325 | 0.046 | 0.23 |
| 11 | 16.3 | 14.6 | 0.01 | 0.714 | 0.0018 | 0.012 | 0.195 | 0.028 | 0.40 |
| 12 | 15.8 | 16.7 | 6.98 | 0.593 | 0.0007 | 0.012 | 0.355 | 0.008 | 0.11 |
| 13 | 19.8 | 15.8 | 2.03 | 0.001 | 0.0025 | 0.028 | 0.074 | 0.094 | 0.30 |
| 14 | 16.9 | 15.5 | 3.97 | 2.495 | 0.0022 | 0.027 | 0.290 | 0.081 | 0.27 |
| 15 | 20.2 | 14.6 | 4.46 | 0.419 | 0.0001 | 0.023 | 0.054 | 0.048 | 0.38 |
| 16 | 19.8 | 20.2 | 0.06 | 0.920 | 0.0049 | 0.010 | 0.091 | 0.040 | 0.31 |
| 17 | 21.0 | 18.8 | 0.62 | 0.970 | 0.0006 | 0.001 | 0.179 | 0.005 | 0.04 |
| 18 | 17.4 | 19.9 | 1.95 | 0.035 | 0.0028 | 0.040 | 0.248 | 0.037 | 0.31 |
| 19 | 18.4 | 19.2 | 0.54 | 0.469 | 0.0012 | 0.022 | 0.005 | 0.048 | 0.08 |
| 20 | 16.3 | 20.3 | 0.41 | 0.546 | 0.0022 | 0.005 | 0.495 | 0.066 | 0.11 |
| 21 | 15.7 | 14.8 | 4.23 | 0.279 | 0.0018 | 0.017 | 0.012 | 0.001 | 0.08 |
| 22 | 19.2 | 19.9 | 1.72 | 0.204 | 0.0029 | 0.029 | 0.343 | 0.199 | 0.30 |
| 23 | 22.1 | 18.4 | 1.19 | 0.171 | 0.0026 | 0.013 | 0.203 | 0.013 | 0.01 |
| 24 | 18.0 | 19.9 | 2.43 | 0.077 | 0.0024 | 0.027 | 0.326 | 0.021 | 0.49 |
| 25 | 21.7 | 19.7 | 3.87 | 0.806 | 0.0006 | 0.004 | 0.056 | 0.052 | 0.34 |
| 26 | 19.9 | 18.7 | 0.58 | 0.609 | 0.0017 | 0.019 | 0.045 | 0.063 | 0.08 |
| 27 | 20.8 | 16.2 | 2.24 | 0.644 | 0.0028 | 0.015 | 0.141 | 0.048 | 0.21 |
| 28 | 20.6 | 14.2 | 2.03 | 0.662 | 0.0026 | 0.009 | 0.236 | 0.007 | 0.30 |
| 29 | 17.0 | 18.4 | 2.31 | 0.812 | 0.0005 | 0.028 | 0.359 | 0.036 | 0.11 |
| 30 | 17.7 | 15.7 | 2.10 | 0.256 | 0.0013 | 0.024 | 0.123 | 0.070 | 0.39 |
| 31 | 21.6 | 15.8 | 2.54 | 0.723 | 0.0016 | 0.012 | 0.273 | 0.009 | 0.24 |
| 32 | 18.5 | 19.8 | 2.79 | 0.110 | 0.0020 | 0.016 | 0.036 | 0.026 | 0.21 |
| 33 | 19.1 | 14.1 | 0.82 | 0.785 | 0.0008 | 0.026 | 0.197 | 0.097 | 0.08 |
| 34 | 15.9 | 15.8 | 3.79 | 0.565 | 0.0008 | 0.021 | 0.090 | 0.073 | 0.33 |
| 35 | 19.7 | 14.1 | 3.43 | 0.242 | 0.0010 | 0.019 | 0.191 | 0.028 | 0.24 |
| 36 | 15.3 | 16.5 | 4.45 | 0.244 | 0.0005 | 0.028 | 0.361 | 0.064 | 0.24 |
| 37 | 18.5 | 14.5 | 0.38 | 0.477 | 0.0013 | 0.011 | 0.305 | 0.040 | 0.40 |
| 38 | 20.5 | 17.2 | 3.51 | 0.927 | 0.0016 | 0.004 | 0.138 | 0.050 | 0.04 |
| 39 | 18.8 | 14.7 | 1.49 | 0.372 | 0.0003 | 0.016 | 0.349 | 0.015 | 0.34 |
| 40 | 18.3 | 16.0 | 4.06 | 0.700 | 0.0003 | 0.019 | 0.356 | 0.004 | 0.14 |

TABLE 2

(Continued from Table 1)

| Alloy powder | Ti | Cu | V | B | Zr | O | Ta | W | Ni + unavoidable impurities |
|---|---|---|---|---|---|---|---|---|---|
| 1 | 0.012 | 0.031 | 0.008 | 0.0007 | 0.0062 | 0.0012 | 1.8 | — | Remainder |
| 2 | 0.014 | 0.033 | 0.043 | 0.0006 | 0.0083 | 0.0154 | — | 2.9 | Remainder |
| 3 | 0.009 | 0.021 | 0.007 | 0.0007 | 0.0064 | 0.0176 | — | 3.7 | Remainder |
| 4 | 0.006 | 0.027 | 0.103 | 0.0007 | 0.0071 | 0.0157 | — | — | Remainder |
| 5 | 0.063 | 0.035 | 0.088 | 0.0012 | 0.0086 | 0.0174 | — | 3.9 | Remainder |
| 6 | 0.041 | 0.044 | 0.109 | 0.0016 | 0.0010 | 0.0166 | — | — | Remainder |
| 7 | 0.062 | 0.058 | 0.078 | 0.0024 | 0.0034 | 0.0176 | — | — | Remainder |
| 8 | 0.165 | 0.043 | 0.037 | 0.0003 | 0.0074 | 0.0174 | — | — | Remainder |
| 9 | 0.163 | 0.046 | 0.181 | 0.0018 | 0.0043 | 0.0032 | — | — | Remainder |
| 10 | 0.188 | 0.060 | 0.153 | 0.0037 | 0.0030 | 0.0089 | — | — | Remainder |
| 11 | 0.183 | 0.066 | 0.053 | 0.0038 | 0.0073 | 0.0092 | — | — | Remainder |
| 12 | 0.070 | 0.081 | 0.115 | 0.0025 | 0.0047 | 0.0178 | — | — | Remainder |
| 13 | 0.031 | 0.057 | 0.196 | 0.0029 | 0.0049 | 0.0107 | — | — | Remainder |
| 14 | 0.134 | 0.030 | 0.105 | 0.0020 | 0.0035 | 0.0199 | — | — | Remainder |
| 15 | 0.049 | 0.092 | 0.108 | 0.0010 | 0.0018 | 0.0098 | — | — | Remainder |
| 16 | 0.101 | 0.073 | 0.149 | 0.0023 | 0.0061 | 0.0157 | — | — | Remainder |
| 17 | 0.052 | 0.056 | 0.138 | 0.0010 | 0.0046 | 0.0130 | — | — | Remainder |
| 18 | 0.177 | 0.094 | 0.016 | 0.0025 | 0.0072 | 0.0089 | — | — | Remainder |
| 19 | 0.066 | 0.043 | 0.018 | 0.0014 | 0.0020 | 0.0112 | — | — | Remainder |
| 20 | 0.133 | 0.057 | 0.076 | 0.0037 | 0.0072 | 0.0112 | — | — | Remainder |
| 21 | 0.113 | 0.011 | 0.098 | 0.0033 | 0.0047 | 0.0029 | — | — | Remainder |
| 22 | 0.136 | 0.083 | 0.120 | 0.0021 | 0.0067 | 0.0054 | — | — | Remainder |
| 23 | 0.096 | 0.020 | 0.135 | 0.0021 | 0.0023 | 0.0113 | — | — | Remainder |
| 24 | 0.181 | 0.058 | 0.025 | 0.0012 | 0.0071 | 0.0145 | — | — | Remainder |
| 25 | 0.001 | 0.028 | 0.162 | 0.0029 | 0.0043 | 0.0156 | — | — | Remainder |
| 26 | 0.496 | 0.078 | 0.171 | 0.0030 | 0.0079 | 0.0171 | — | — | Remainder |
| 27 | 0.019 | 0.001 | 0.127 | 0.0026 | 0.0016 | 0.0109 | — | — | Remainder |
| 28 | 0.038 | 0.248 | 0.165 | 0.0024 | 0.0066 | 0.0142 | — | — | Remainder |
| 29 | 0.088 | 0.098 | 0.001 | 0.0013 | 0.0045 | 0.0157 | — | — | Remainder |
| 30 | 0.190 | 0.020 | 0.298 | 0.0039 | 0.0023 | 0.0155 | — | — | Remainder |
| 31 | 0.130 | 0.047 | 0.153 | 0.0001 | 0.0073 | 0.0179 | — | — | Remainder |
| 32 | 0.073 | 0.076 | 0.097 | 0.0049 | 0.0045 | 0.0165 | — | — | Remainder |
| 33 | 0.030 | 0.074 | 0.182 | 0.0033 | 0.0001 | 0.0134 | — | — | Remainder |
| 34 | 0.046 | 0.033 | 0.117 | 0.0025 | 0.0099 | 0.0031 | — | — | Remainder |
| 35 | 0.127 | 0.065 | 0.100 | 0.0010 | 0.0018 | 0.0010 | — | — | Remainder |
| 36 | 0.094 | 0.049 | 0.127 | 0.0030 | 0.0048 | 0.0297 | — | — | Remainder |

TABLE 2-continued (Continued from Table 1)

Component composition (mass %)

| Alloy powder | Ti | Cu | V | B | Zr | O | Ta | W | Ni + unavoidable impurities |
|---|---|---|---|---|---|---|---|---|---|
| 37 | 0.144 | 0.091 | 0.040 | 0.0021 | 0.0048 | 0.0035 | 1.1 | — | Remainder |
| 38 | 0.019 | 0.047 | 0.155 | 0.0034 | 0.0067 | 0.0031 | 2.5 | — | Remainder |
| 39 | 0.020 | 0.005 | 0.039 | 0.0033 | 0.0068 | 0.0140 | — | 2.1 | Remainder |
| 40 | 0.152 | 0.082 | 0.180 | 0.0013 | 0.0031 | 0.0192 | — | 5.0 | Remainder |

TABLE 3

(Continued in Table 4)

| Alloy powder | Component composition (mass %) | | | | | | | | |
|---|---|---|---|---|---|---|---|---|---|
|  | Cr | Mo | Fe | Co | Mg | N | Mn | Si | Al |
| 41 | 14.3* | 14.6 | 2.50 | 1.405 | 0.0024 | 0.018 | 0.053 | 0.063 | 0.37 |
| 42 | 24.2* | 14.8 | 2.46 | 0.086 | 0.0028 | 0.030 | 0.059 | 0.019 | 0.45 |
| 43 | 19.0 | 11.8* | 0.17 | 0.952 | 0.0009 | 0.014 | 0.224 | 0.075 | 0.10 |
| 44 | 21.1 | 23.2* | 5.13 | 1.193 | 0.0012 | 0.011 | 0.347 | 0.018 | 0.21 |
| 45 | 22.6 | 19.4 | —* | 1.849 | 0.0016 | 0.031 | 0.413 | 0.096 | 0.16 |
| 46 | 20.4 | 18.1 | 7.05* | 1.432 | 0.0021 | 0.021 | 0.245 | 0.006 | 0.06 |
| 47 | 18.1 | 13.7 | 0.77 | —* | 0.0037 | 0.038 | 0.318 | 0.109 | 0.10 |
| 48 | 17.4 | 14.3 | 4.35 | 2.505* | 0.0009 | 0.031 | 0.156 | 0.039 | 0.17 |
| 49 | 16.7 | 16.6 | 0.47 | 0.073 | — | 0.012 | 0.466 | 0.126 | 0.29 |
| 50 | 21.8 | 19.2 | 4.85 | 1.692 | 0.0052 | 0.015 | 0.496 | 0.047 | 0.27 |
| 51 | 20.7 | 20.0 | 3.47 | 1.551 | 0.0018 | — | 0.450 | 0.119 | 0.02 |
| 52 | 15.5 | 17.3 | 3.80 | 2.027 | 0.0020 | 0.043* | 0.431 | 0.017 | 0.13 |
| 53 | 14.9 | 17.7 | 5.23 | 0.996 | 0.0006 | 0.018 | 0.003 | 0.064 | 0.15 |
| 54 | 22.2 | 21.9 | 4.27 | 1.017 | 0.0049 | 0.016 | 0.522* | 0.011 | 0.05 |
| 55 | 16.3 | 12.9 | 0.54 | 2.172 | 0.0026 | 0.028 | 0.366 | —* | 0.33 |
| 56 | 21.6 | 22.4 | 5.34 | 1.325 | 0.0038 | 0.006 | 0.298 | 0.204* | 0.42 |
| 57 | 14.8 | 18.3 | 0.46 | 0.615 | 0.0047 | 0.006 | 0.446 | 0.085 | —* |
| 58 | 18.2 | 13.7 | 0.58 | 1.870 | 0.0045 | 0.021 | 0.372 | 0.087 | 0.53* |
| 59 | 22.3 | 17.7 | 0.53 | 0.550 | 0.0018 | 0.007 | 0.241 | 0.076 | 0.28 |
| 60 | 23.9 | 19.7 | 3.33 | 1.398 | 0.0039 | 0.038 | 0.304 | 0.019 | 0.47 |
| 61 | 21.6 | 19.4 | 5.36 | 1.385 | 0.0025 | 0.010 | 0.295 | 0.190 | 0.49 |
| 62 | 18.4 | 16.6 | 2.88 | 0.371 | 0.0023 | 0.037 | 0.338 | 0.065 | 0.12 |
| 63 | 20.3 | 18.8 | 3.71 | 0.176 | 0.0027 | 0.006 | 0.430 | 0.187 | 0.30 |
| 64 | 21.0 | 21.0 | 1.80 | 0.397 | 0.0045 | 0.028 | 0.215 | 0.184 | 0.28 |
| 65 | 21.0 | 19.5 | 2.92 | 1.267 | 0.0030 | 0.037 | 0.179 | 0.140 | 0.22 |
| 66 | 18.4 | 14.0 | 3.50 | 0.908 | 0.0040 | 0.014 | 0.294 | 0.146 | 0.07 |
| 67 | 20.5 | 14.3 | 3.82 | 0.513 | 0.0013 | 0.007 | 0.250 | 0.111 | 0.39 |
| 68 | 21.4 | 20.7 | 1.97 | 0.648 | 0.0036 | 0.002 | 0.161 | 0.133 | 0.04 |
| 69 | 19.8 | 18.0 | 0.14 | 2.089 | 0.0005 | 0.016 | 0.258 | 0.120 | 0.09 |
| 70 | 17.8 | 20.8 | 0.83 | 0.921 | 0.0015 | 0.023 | 0.343 | 0.200 | 0.31 |

(note)
*indicates beyond the scope of the present invention

TABLE 4

(Continued from Table 3)

Component composition (mass %)

| Alloy powder | Ti | Cu | V | B | Zr | O | Ta | W | Ni + unavoidable impurities |
|---|---|---|---|---|---|---|---|---|---|
| 41 | 0.340 | 0.074 | 0.076 | 0.0027 | 0.0081 | 0.0291 | — | — | Remainder |
| 42 | 0.236 | 0.110 | 0.027 | 0.0037 | 0.0020 | 0.0196 | — | — | Remainder |
| 43 | 0.126 | 0.025 | 0.074 | 0.0004 | 0.0027 | 0.0085 | — | — | Remainder |
| 44 | 0.358 | 0.019 | 0.282 | 0.0030 | 0.0054 | 0.0193 | — | — | Remainder |
| 45 | 0.406 | 0.097 | 0.219 | 0.0003 | 0.0074 | 0.0260 | — | — | Remainder |
| 46 | 0.382 | 0.166 | 0.251 | 0.0002 | 0.0078 | 0.0110 | — | — | Remainder |
| 47 | 0.454 | 0.126 | 0.091 | 0.0003 | 0.0037 | 0.0173 | — | — | Remainder |

TABLE 4-continued (Continued from Table 3)

Component composition (mass %)

| Alloy powder | Ti | Cu | V | B | Zr | O | Ta | W | Ni + unavoidable impurities |
|---|---|---|---|---|---|---|---|---|---|
| 48 | 0.348 | 0.166 | 0.112 | 0.0044 | 0.0075 | 0.0158 | — | — | Remainder |
| 49 | 0.193 | 0.094 | 0.078 | 0.0025 | 0.0087 | 0.0229 | — | — | Remainder |
| 50 | 0.129 | 0.094 | 0.216 | 0.0048 | 0.0033 | 0.0059 | — | — | Remainder |
| 51 | 0.142 | 0.203 | 0.258 | 0.0014 | 0.0021 | 0.0107 | — | — | Remainder |
| 52 | 0.197 | 0.126 | 0.190 | 0.0049 | 0.0010 | 0.0136 | — | — | Remainder |
| 53 | 0.108 | 0.215 | 0.037 | 0.0025 | 0.0051 | 0.0033 | — | — | Remainder |
| 54 | 0.199 | 0.086 | 0.230 | 0.0017 | 0.0060 | 0.0106 | — | — | Remainder |
| 55 | 0.369 | 0.036 | 0.275 | 0.0006 | 0.0023 | 0.0124 | — | — | Remainder |
| 56 | 0.201 | 0.072 | 0.271 | 0.0024 | 0.0027 | 0.0083 | — | — | Remainder |
| 57 | 0.098 | 0.094 | 0.174 | 0.0004 | 0.0041 | 0.0246 | — | — | Remainder |
| 58 | 0.475 | 0.054 | 0.233 | 0.0023 | 0.0006 | 0.0162 | — | — | Remainder |
| 59 | —* | 0.064 | 0.158 | 0.0048 | 0.0071 | 0.0095 | — | — | Remainder |
| 60 | 0.505* | 0.237 | 0.064 | 0.0019 | 0.0081 | 0.0192 | — | — | Remainder |
| 61 | 0.417 | — | 0.148 | 0.0004 | 0.0083 | 0.0125 | — | — | Remainder |
| 62 | 0.064 | 0.253* | 0.045 | 0.0025 | 0.0090 | 0.0244 | — | — | Remainder |
| 63 | 0.435 | 0.247 | —* | 0.0022 | 0.0074 | 0.0168 | — | — | Remainder |
| 64 | 0.073 | 0.152 | 0.303* | 0.0019 | 0.0001 | 0.0284 | — | — | Remainder |
| 65 | 0.149 | 0.199 | 0.246 | —* | 0.0056 | 0.0015 | — | — | Remainder |
| 66 | 0.001 | 0.236 | 0.245 | 0.0052* | 0.0044 | 0.0099 | — | — | Remainder |
| 67 | 0.006 | 0.212 | 0.284 | 0.0022 | —* | 0.0149 | — | — | Remainder |
| 68 | 0.162 | 0.064 | 0.119 | 0.0028 | 0.0105 | 0.0222 | — | — | Remainder |
| 69 | 0.280 | 0.175 | 0.106 | 0.0033 | 0.0001 | —* | — | — | Remainder |
| 70 | 0.255 | 0.161 | 0.009 | 0.0026 | 0.0097 | 0.0303* | — | — | Remainder |

(note)
*indicates beyond the scope of the present invention

Next, according to the powder bed method (SLM) additive manufacturing device using a laser shown in FIG. 1, using Ni-based corrosion resistant alloy powders 1 to 70, 10 plates (30×30×5 mm) were prepared as evaluation additive manufacturing products for each powder.

These plates (30×30×5 mm) as the evaluation additive manufacturing products were evaluated as follows.

[Measurement of Defect Rate (Area %)]

A cross section of the plate (30×30×5 mm) as the evaluation additive manufacturing product was cut and embedded in a resin, and the plate was polished to #1500 with water resistant emery paper, and then additionally polished with a diamond paste having a particle size of 1 μm to achieve a mirror-finished surface.

The mirror-finished surface was observed under an optical microscope, defects (voids and nests of 1 μm square or more) within a range of 1 mm×1 mm were identified by an image analysis device (digital microscope VHX6000: commercially available from Keyence Corporation), and the area ratio thereof was determined as a defect rate (area %).

Here, the resolution was 1,024×1,280 pixels, binarization was performed by image analysis software, and a black part of 8 or more pixels was defined as a defect.

Table 5 and Table 6 show the values of the defect rate (area %).

[Evaluation of Corrosion Resistance in Wet Environment]

The surface of the plate (30×30×5 mm) as the evaluation additive manufacturing product was polished, and finally finished to #400 with water resistant emery paper. Then, electropolishing was performed, and the polished sample was kept in an ultrasonic vibration state in acetone for 5 minutes and degreased to prepare a corrosion test piece.

A corrosion test was performed using these corrosion test pieces in boiling 1% HCl and 35% HCl for 24 hours.

When the weight loss amount before and after the test was measured, a corrosion rate (mm/year) was calculated from the surface area before the test and the test period.

The results are shown in Table 5 and Table 6.

[Evaluation of Corrosion Resistance with Respect to Semiconductor Process Gas]

The surface of the plate (30×30×5 mm) as the evaluation additive manufacturing product was polished, and finally finished to #400 with water resistant emery paper. Then, electropolishing was performed, and the polished sample was kept in an ultrasonic vibration state in acetone for 5 minutes and degreased to prepare a corrosion test piece.

These corrosion test pieces were placed in a small test chamber made of a Ni-based alloy (UNS N06022), the chamber was evacuated, and then filled with a corrosion gas (C12, HBr, $NF_3$), and kept at a predetermined temperature ($Cl_2$: 250° C., HBr: 250° C., $NF_3$: 350° C.) for 24 hours according to the type of the corrosion gas, and the temperature was then cooled to room temperature, replacement with argon gas was performed and the sample was then quickly stored in a vacuum desiccator.

The corrosion test pieces were sequentially subjected to SEM observation, and an area ratio of the corroded part observed in an island shape from the captured image was measured by image analysis software (winRooF2015).

Here, the resolution was 1,024×1,280, and the magnification was 500, and an area of 8 pixels or more was defined as a corroded area.

The results are shown in Table 5 and Table 6.

Here, the ratio of the powder that can be used after classification to the atomized powder without change was defined as a powder yield, and corrosion test pieces were not prepared, and no corrosion resistance evaluation was performed for the alloy powder having a small powder yield value and the alloy powder having a high defect rate.

TABLE 5

| Alloy powder | Defect rate (area %) | Corrosion resistance in wet environment (corrosion rate, mm/year) | | Corrosion resistance with respect to halogen-containing gas (area ratio % of corroded part) | | | Note |
|---|---|---|---|---|---|---|---|
| | | 1% HCl | 35% HCl | Cl$_2$ | HBr | NF$_3$ | |
| 1 | 0.5 | 0.01 | 0.11 | 0.35 | 0.47 | 0.43 | |
| 2 | 0.4 | 0.13 | 0.13 | 2.55 | 0.40 | 2.34 | |
| 3 | 0.3 | 0.45 | 0.15 | 3.26 | 0.94 | 3.79 | |
| 4 | 0.7 | 0.15 | 0.18 | 3.84 | 4.87 | 2.53 | |
| 5 | 0.7 | 0.03 | 0.16 | 4.78 | 3.28 | 4.63 | |
| 6 | 0.7 | 0.08 | 0.12 | 0.45 | 2.83 | 3.00 | |
| 7 | 0.4 | 0.08 | 0.16 | 0.93 | 2.87 | 3.85 | |
| 8 | 0.5 | 0.06 | 0.13 | 0.38 | 2.28 | 4.64 | |
| 9 | 0.9 | 0.06 | 0.26 | 3.57 | 2.37 | 3.23 | |
| 10 | 0.6 | 0.01 | 0.10 | 3.78 | 2.82 | 2.98 | |
| 11 | 0.6 | 0.21 | 0.18 | 0.36 | 0.68 | 4.60 | |
| 12 | 0.4 | 0.16 | 0.17 | 0.42 | 1.81 | 4.35 | |
| 13 | 0.9 | 0.17 | 0.02 | 4.81 | 3.07 | 1.50 | |
| 14 | 0.4 | 0.07 | 0.26 | 1.34 | 4.84 | 2.09 | |
| 15 | 0.6 | 0.11 | 0.02 | 0.99 | 3.75 | 4.60 | |
| 16 | 0.7 | 0.18 | 0.05 | 2.39 | 3.19 | 1.01 | |
| 17 | 0.4 | 0.04 | 0.02 | 1.01 | 2.42 | 0.99 | |
| 18 | 0.4 | 0.13 | 0.05 | 2.03 | 3.65 | 4.48 | |
| 19 | 0.6 | 0.01 | 0.04 | 4.15 | 1.49 | 2.32 | |
| 20 | 0.3 | 0.11 | 0.19 | 4.95 | 2.39 | 0.96 | |
| 21 | 0.4 | 0.08 | 0.08 | 1.83 | 3.50 | 2.29 | |
| 22 | 0.4 | 0.11 | 0.08 | 4.72 | 3.51 | 2.93 | |
| 23 | 0.4 | 0.03 | 0.11 | 2.93 | 3.68 | 2.16 | |
| 24 | 0.2 | 0.05 | 0.19 | 1.21 | 2.15 | 0.35 | |
| 25 | 0.5 | 0.01 | 0.20 | 1.51 | 4.35 | 1.32 | |
| 26 | 0.8 | 0.01 | 0.13 | 2.87 | 3.36 | 1.27 | |
| 27 | 0.8 | 0.11 | 0.11 | 2.58 | 1.23 | 2.80 | |
| 28 | 0.4 | 0.06 | 0.23 | 3.91 | 4.68 | 0.73 | |
| 29 | 0.3 | 0.07 | 0.05 | 0.54 | 1.02 | 4.68 | |
| 30 | 0.9 | 0.15 | 0.07 | 4.05 | 4.63 | 1.64 | |
| 31 | 0.8 | 0.02 | 0.19 | 3.55 | 2.36 | 1.05 | |
| 32 | 0.3 | 0.21 | 0.07 | 4.64 | 4.78 | 4.72 | |
| 33 | 0.9 | 0.11 | 0.07 | 4.84 | 3.12 | 2.49 | |
| 34 | 0.6 | 0.13 | 0.15 | 1.61 | 3.54 | 3.80 | |
| 35 | 0.6 | 0.03 | 0.19 | 3.33 | 2.15 | 3.18 | |
| 36 | 0.7 | 0.20 | 0.02 | 0.37 | 4.34 | 3.89 | |
| 37 | 0.5 | 0.15 | 0.13 | 1.76 | 4.41 | 0.52 | |
| 38 | 0.9 | 0.07 | 0.10 | 0.53 | 0.87 | 1.25 | |
| 39 | 0.6 | 0.12 | 0.12 | 0.74 | 0.41 | 0.99 | |
| 40 | 0.9 | 0.41 | 0.14 | 1.98 | 2.99 | 1.83 | |

TABLE 6

| Alloy powder | Defect rate (area %) | Corrosion resistance in wet environment (corrosion rate, mm/year) | | Corrosion resistance with respect to halogen-containing gas (area ratio % of corroded part) | | | Note |
|---|---|---|---|---|---|---|---|
| | | 1% HCl | 35% HCl | Cl$_2$ | HBr | NF$_3$ | |
| 41 | 0.7 | 0.56 | 0.32 | 7.26 | 6.35 | 5.74 | |
| 42 | 0.3 | 0.53 | 0.33 | 7.36 | 7.23 | 8.32 | |
| 43 | 0.6 | 0.66 | 0.29 | 8.55 | 5.33 | 6.21 | |
| 44 | 1.4 | — | — | — | — | — | Large defect |
| 45 | 1.0 | — | — | — | — | — | Poor yield |
| 46 | 0.9 | 0.75 | 0.44 | 6.52 | 4.53 | 5.33 | |
| 47 | 0.4 | — | — | — | — | — | Poor yield |
| 48 | 0.6 | — | — | — | — | — | Poor yield |
| 49 | 0.5 | 0.23 | 0.11 | 5.67 | 3.28 | 4.44 | |
| 50 | 1.0 | 0.16 | 0.23 | 2.67 | 6.57 | 8.32 | |
| 51 | 0.6 | 0.17 | 0.21 | 3.88 | 5.78 | 5.99 | |
| 52 | 1.7 | — | — | — | — | — | Large defect |
| 53 | 0.5 | 0.08 | 0.02 | 5.48 | 3.29 | 6.66 | |
| 54 | 0.7 | 0.55 | 0.37 | 5.26 | 7.62 | 6.27 | |
| 55 | 1.4 | — | — | — | — | — | Large defect |
| 56 | 0.8 | 0.52 | 0.28 | 5.16 | 7.03 | 8.68 | |
| 57 | 1.6 | — | — | — | — | — | Large defect |
| 58 | 2.3 | — | — | — | — | — | Large defect |
| 59 | 1.2 | — | — | — | — | — | Large defect |
| 60 | 1.4 | — | — | — | — | — | Large defect |
| 61 | 0.8 | 0.09 | 0.16 | 5.78 | 6.32 | 6.47 | |
| 62 | 1.5 | — | — | — | — | — | Large defect |
| 63 | 0.7 | — | — | — | — | — | Poor yield |
| 64 | 0.6 | — | — | — | — | — | Poor yield |
| 65 | 1.3 | — | — | — | — | — | Large defect |
| 66 | 0.9 | 0.14 | 0.28 | 6.24 | 5.87 | 7.21 | |
| 67 | 1.4 | — | — | — | — | — | Large defect |
| 68 | 0.4 | 0.16 | 0.12 | 7.21 | 6.93 | 8.56 | |
| 69 | 1.3 | — | — | — | — | — | Large defect |
| 70 | 1.6 | — | — | — | — | — | Large defect |

As can be clearly understood from the results shown in Table 5 and Table 6, it was confirmed that, in the Ni-based corrosion resistant alloy powder for additive manufacturing having the composition according to the present invention, both the defect rate and corrosion resistance (wet environment or semiconductor process gas) of the additive manufacturing product produced using this powder were better than those of the Ni-based corrosion resistant alloy powder for additive manufacturing outside the present invention and the additive manufacturing product produced using this powder. In addition, it was confirmed that, when a more preferable composition was used, high corrosion resistance was exhibited even under a corrosive environment with a semiconductor process gas.

Example 2

Samples with different particle size distributions were prepared for the No. 1 alloy powder from the Ni-based corrosion resistant alloy powders for additive manufacturing having the above component compositions, and d10, d50, and d90 were measured using a laser diffraction type particle size distribution measurement device (SALD-2300: commercially available from SHIMADZU). In addition, the uniformity represented by (d90-d10)/d50 was determined.

Transport properties when these Ni-based corrosion resistant alloy powders were supplied onto beds, and squeezed to form a powder layer with a thickness of 70 to 200 μm were evaluated. For the transport properties, according to visual inspection, if the alloy powder was uniformly supplied and spread to a predetermined thickness, the transport properties were regarded as "good" and if the powder floated and was not properly supplied, the transport properties were regarded as not good "NG."

The results are shown in Table 7.

TABLE 7

| Sample | Particle size distribution | | | | Transport |
|---|---|---|---|---|---|
| No. | d10 | d50 | d90 | Uniformity | properties |
| 2-1* | 7.5 | 12.5 | 25.1 | 1.4 | NG |
| 2-2* | 11.5 | 31.4 | 64.5 | 1.7 | NG |
| 2-3 | 19.5 | 37.6 | 57.1 | 1.0 | Good |
| 2-4 | 32.8 | 58.6 | 97.4 | 1.1 | Good |
| 2-5 | 54.3 | 107.2 | 143.6 | 0.8 | Good |
| 2-6 | 98.7 | 216.5 | 423.4 | 1.5 | Good |
| 2-7* | 184.7 | 362.3 | 821.9 | 1.8 | NG |

*indicates beyond the scope of the present invention

Based on Table 7, it was confirmed that the alloy powder in the particle size distribution range of the present invention had good transport properties. In addition, the uniformity was within 1.5 or less, and spreading properties were uniform at 0.8 to 1.1, and good spreading properties were obtained in the result. Therefore, when these Ni-based corrosion resistant alloy powders are used, an additive manufacturing product having a low defect rate is expected to be obtained.

INDUSTRIAL APPLICABILITY

When the Ni-based corrosion resistant alloy powder of the invention is used as a raw material powder for additive manufacturing, an additive manufacturing product having excellent corrosion resistance and very few defects can be obtained. For example, it is possible to provide a member for semiconductor manufacturing device made of an additive manufacturing product, but it is expected to be applied as a corrosion resistant metal powder for additive manufacturing of a member having a complex shape not only for a member for semiconductor manufacturing device, but also in a wide range of fields such as chemical plants, pharmaceutical manufacturing facilities, and oil and gas fields.

The invention claimed is:

1. A Ni-based corrosion resistant alloy powder for additive manufacturing, composed of a powder of a Ni-based alloy having a component composition including, in mass %,
   Cr: 14.5 to 24.5%,
   Mo: 12.0 to 23.0%,
   Fe: 0.01 to 7.00%,
   Co: 0.001 to 2.500%,
   Ta: 1.0 to 2.5%,
   Mg: 0.010% or less,
   N: 0.040% or less,
   Mn: 0.001 to 0.50%,
   Si: 0.001 to 0.200%,
   Al: more than 0 and 0.50% or less,
   Ti: 0.001 to 0.500%,
   Cu: 0.250% or less,
   V: 0.001 to 0.300%,
   B: 0.0001 to 0.0050%,
   Zr: 0.0001 to 0.0200%, and
   O: 0.0010 to 0.0300%,
   with the remainder being Ni and unavoidable impurities,
      wherein C, S and P are contained as the unavoidable impurities (C: less than 0.05%, S: less than 0.01% and P: less than 0.01%),
      wherein, in a cumulative distribution curve showing the relationship between a particle size and a volume cumulative from a small particle size side obtained by a laser diffraction method,
         a particle size d10 corresponding to a cumulative frequency of 10 volume % of the powder is 15 μm or more and 100 μm or less,
         a particle size d50 corresponding to a cumulative frequency of 50 volume % of the powder is 30 μm or more and 250 μm or less, and
         a particle size d90 corresponding to a cumulative frequency of 90 volume % of the powder is 50 μm or more and 480 μm or less.

2. The Ni-based corrosion resistant alloy powder for additive manufacturing according to claim 1,
   wherein, in the cumulative distribution curve, the uniformity represented by (d90−d10)/d50 is 1.5 or less.

3. The Ni-based corrosion resistant alloy powder for additive manufacturing according to claim 1,
   wherein the component composition of the Ni-based alloy further includes W: 5.0% or less.

4. The Ni-based corrosion resistant alloy powder for additive manufacturing according to claim 1,
   wherein the particle size d50 corresponding to a cumulative frequency of 50 volume % of the powder is 60 μm or more and 250 μm or less.

5. A method of manufacturing an additive manufacturing product, comprising
   performing additive manufacturing using the Ni-based corrosion resistant alloy powder for additive manufacturing according to claim 1 as a raw material powder.

6. The method of manufacturing an additive manufacturing product according to claim 5,
   wherein the additive manufacturing product is a member for semiconductor manufacturing device.

7. The method of manufacturing an additive manufacturing product according to claim 5,
   wherein the additive manufacturing is a powder bed fusion method using an electron beam or a directed energy deposition method using an electron beam.

* * * * *